R. DE CARVALHO & J. G. CARREIRA.
PORTABLE APPARATUS FOR THE INSTANTANEOUS PRODUCTION OF FRESH SOLUTIONS.
APPLICATION FILED AUG. 7, 1915.
1,207,860.  Patented Dec. 12, 1916.
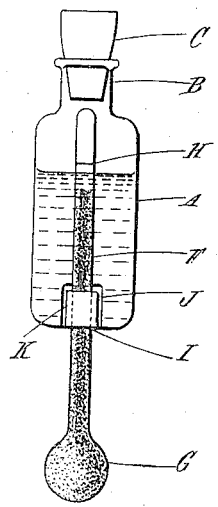

UNITED STATES PATENT OFFICE.

RAUL DE CARVALHO AND JOAO GUIMARAES CARREIRA, OF LISBON, PORTUGAL.

PORTABLE APPARATUS FOR THE INSTANTANEOUS PRODUCTION OF FRESH SOLUTIONS.

1,207,860.  Specification of Letters Patent.  Patented Dec. 12, 1916.

Application filed August 7, 1915. Serial No. 44,362.

*To all whom it may concern:*

Be it known that we, RAUL DE CARVALHO and JOAO GUIMARAES CARREIRA, citizens of the Portuguese Republic and of the Brazilian Republic, residing at Lisbon, in the Republic of Portugal, have invented certain new and useful Improvements in Portable Apparatus for the Instantaneous Production of Fresh Solutions, of which the following is a specification.

The present invention consists of a portable apparatus for the instantaneous production of fresh solutions and comprises the following:—A receptacle in the form of a tube or a bulb, intended to contain the solvent; a second receptacle of tubular form adapted to be displaced within the first one, and intended to contain the substance to be dissolved, closed at its ends, the second receptacle having on it a file mark in a determined position, which permits, when this receptacle is moved and fractured at the file mark, the substance to be dissolved to come into intimate contact with the solvent and so cause the solution to be instantaneously formed.

The receptacle intended to contain the solvent may terminate in different shapes, both at its upper and lower parts, and the movement within it of the tubular receptacle, intended to contain the substance to be dissolved may take place either below upward or from above downward.

The apparatus is represented in the accompanying drawing.

The receptacle A terminates at its lower end in an opening I where the wall of the vessel is prolonged into the interior of the receptacle in the form of a tubular neck J, closed by a paraffined stopper or cork, or india rubber K, through which passes the tubular receptacle F, intended to contain the substance to be dissolved. This latter, having a file mark H upon it, is closed at the top and terminates at its lower end in a small bulb G.

To obtain a solution the stopper C is withdrawn, the tubular receptacle F caused to move by giving a rotary movement to the bulb G and pushing it until the file mark H emerges from the neck B; the tubular receptacle is then severed at the file mark, drawn back into the receptacle A, this latter closed by the stopper C, and by inverting the apparatus the substance to be dissolved and contained in F falls into the receptacle A and is brought into contact with the solvent therein contained, thus instantaneously forming the solution.

We claim:—

1. Portable apparatus for the instantaneous production of fresh solutions comprising a vessel intended to contain a solvent, a plurality of orifices in said vessel, a bored stopper in one of said orifices, a tubular vessel containing a substance to be dissolved closed at each end extending through said bored stopper into said first mentioned vessel, a filed notch on said tubular vessel said tubular vessel being adapted to be moved to extend through another of said orifices to bring the filed notch outside the first mentioned vessel, to be fractured at said file mark and then withdrawn into the first mentioned vessel to permit the substance in the two vessels to come into contact with each other, substantially as described.

2. Portable apparatus for the instantaneous production of fresh solutions comprising a vessel open at each end and intended to contain a solvent, a bored stopper closing one end of said vessel, a solid stopper normally closing the other end of said vessel, a tubular vessel containing a substance to be dissolved, closed at each end extending through said bored stopper into said first mentioned vessel, a filed notch in said tubular vessel, said tubular vessel being adapted to be moved through the opening normally closed by the solid stopper when the latter has been removed, to bring the filed notch outside the first mentioned vessel, to be fractured at said file mark and then withdrawn into the first mentioned vessel to permit the substances in the two vessels to come into contact with each other substantially as described.

3. Portable apparatus for the instantaneous production of fresh solutions comprising a vessel open at each end intended to contain a solvent, an inwardly directed neck at one end of said vessel, a bored stopper fitting within said neck, a solid stopper normally closing the other end of said vessel, a tubular vessel containing a substance to be dissolved, closed at each end extending through said bored stopper into said first mentioned vessel, a filed notch in said tubular vessel said tubular vessel being adapted to be moved through the opening normally closed by the solid stopper when the latter has been removed, to bring the filed notch outside the first mentioned vessel, to be fractured at said file mark and then withdrawn into the first mentioned vessel to permit the substances in the two vessels to come into contact with each other substantially as described.

4. Portable apparatus for the instantaneous production of fresh solutions comprising a vessel intended to contain a solvent, an orifice in said vessel a bored stopper in said orifice, a tubular vessel containing a substance to be dissolved closed at each end extending through said bored stopper into said first mentioned vessel, the said tubular vessel being formed with a bulb at one end, a filed notch on said tubular vessel said tubular vessel being adapted to be moved to bring the filed notch outside the first mentioned vessel, to be fractured at said file mark and then withdrawn into the first mentioned vessel to permit the substances in the two vessels to come into contact with each other, substantially as described.

5. Portable apparatus for the instantaneous production of fresh solutions comprising a vessel open at each end and intended to contain a solvent, a bored stopper closing one end of said vessel, a solid stopper normally closing the other end of said vessel, a tubular glass vessel containing a substance to be dissolved closed at each end extending through said bored stopper into said first mentioned vessel, the said tubular vessel being formed with a bulb at one end, a filed notch in said tubular vessel said tubular vessel being adapted to be moved through the opening normally closed by the solid stopper when the latter has been removed, to bring the filed notch outside the first mentioned vessel, to be fractured at said file mark and then withdrawn into the first mentioned vessel to permit the substance in the two vessels to come into contact with each other substantially as described.

In testimony whereof we affix our signatures in presence of two witnesses.

RAUL DE CARVALHO.
JOAO GUIMARAES CARREIRA.

Witnesses:
   RUDOLF HORNER,
   JUEDOJUCT DE CUNTES SAMPEIS.

Copies of this patent may be obtained for five cents each, by addressing the "Commissioner of Patents, Washington, D C."